United States Patent
Mazur et al.

(10) Patent No.: US 6,796,029 B2
(45) Date of Patent: Sep. 28, 2004

(54) METHOD OF MAKING A WHEEL END ASSEMBLY WITH A MACHINED ROTOR HAVING REDUCED ON-VEHICLE RUNOUT

(75) Inventors: Michael J. Mazur, Dearborn Heights, MI (US); Douglas C. Myers, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 67 days.

(21) Appl. No.: 10/201,239

(22) Filed: Jul. 22, 2002

(65) Prior Publication Data
US 2004/0010915 A1 Jan. 22, 2004

(51) Int. Cl.[7] .............................. B21D 53/26; B21K 1/34
(52) U.S. Cl. ....................... 29/894.361; 29/434; 29/557; 29/898.09; 188/18 R; 188/218 XL; 451/902
(58) Field of Search ................................ 451/290, 902, 451/63; 29/898.09, 898.07, 894.323, 894.325, 894.361, 894.362, 434, 557; 82/1.11, 112; 188/18 R, 218 XL

(56) References Cited

U.S. PATENT DOCUMENTS

| | | |
|---|---|---|
| 1,665,437 A | 4/1928 | Booth |
| 1,816,643 A | 7/1931 | Forsyth |
| 2,022,041 A | 11/1935 | Kliesrath |
| 2,412,432 A | 12/1946 | Tack |
| 2,603,316 A | 7/1952 | Pierce |
| 3,583,511 A | 6/1971 | Asberg et al. |
| 3,756,063 A * | 9/1973 | Roze et al. .................... 72/356 |
| 3,767,221 A | 10/1973 | Asberg |
| 3,884,331 A | 5/1975 | Asberg |
| 4,067,621 A | 1/1978 | Reppert |
| 4,270,805 A | 6/1981 | Spisak |
| 4,383,588 A | 5/1983 | Krude |
| 4,544,209 A | 10/1985 | Braungart |
| 4,621,700 A | 11/1986 | Merkelbach |
| 4,792,020 A | 12/1988 | Okumura et al. |
| 4,819,769 A | 4/1989 | Metzler et al. |
| 4,880,281 A | 11/1989 | Merkelbach |
| 5,107,966 A | 4/1992 | Metzler et al. |
| 5,109,960 A | 5/1992 | Gunther |
| 5,366,279 A | 11/1994 | Polka |

(List continued on next page.)

FOREIGN PATENT DOCUMENTS

| | | |
|---|---|---|
| DE | 1189877 | 3/1965 |
| DE | 2263643 | 7/1974 |
| DE | 2728335 A1 | 1/1978 |

(List continued on next page.)

OTHER PUBLICATIONS

WO 98/25045, Jun. 11, 1998, Composite Cast Brake Elements, Such As Brake Drum, Brake Disk Or The Like, And Composite Casting Process For Brake Elements.
WO 99/28641, Jun. 10, 1999, Bainitically Hardened Brake Disk.

*Primary Examiner*—David P. Bryant
*Assistant Examiner*—Essama Omgba
(74) *Attorney, Agent, or Firm*—Brinks Hofer Gilson & Lione

(57) ABSTRACT

A method of making a wheel end to be installed on a vehicle includes assembling a rotor and components with bearing surfaces to define an assembled module configured to be mounted to the vehicle, and preloading the bearing surfaces of the assembled module in a set amount as required for mounting the assembled module to the vehicle. The method further includes mounting the assembled module on a holding fixture and rotating the assembled module on the holding fixture. The method further includes, while rotating the preloaded assembled module, machining the face of the hub flange prior to affixing a rotor to the flange, and then machining a final cut on the rotor once the rotor is affixed to the flange. After machining, the assembled module remains preloaded with the set amount of preload as the assembled module is installed on the vehicle, thereby providing reduced lateral runout.

11 Claims, 4 Drawing Sheets

U.S. PATENT DOCUMENTS

| | | | | |
|---|---|---|---|---|
| 5,430,926 A | * | 7/1995 | Hartford | 29/434 |
| 5,490,732 A | | 2/1996 | Hofmann et al. | |
| 5,590,967 A | | 1/1997 | Kapaan | |
| 5,653,153 A | * | 8/1997 | Greenwald | 82/1.11 |
| 5,842,388 A | * | 12/1998 | Visser et al. | 82/1.11 |
| 5,884,980 A | * | 3/1999 | Visser et al. | 301/6.1 |
| 5,899,305 A | | 5/1999 | Austin et al. | |
| 5,915,502 A | * | 6/1999 | Rapisardi et al. | 188/18 R |
| 5,937,499 A | | 8/1999 | Austin et al. | |
| 5,983,482 A | * | 11/1999 | Kawatani et al. | 29/557 |
| 5,988,324 A | | 11/1999 | Bertetti et al. | |
| 6,071,180 A | * | 6/2000 | Becker | 451/63 |
| 6,073,735 A | | 6/2000 | Botsch et al. | |
| 6,139,215 A | | 10/2000 | Kuhne et al. | |
| 6,152,270 A | | 11/2000 | Giorgetti | |
| 6,158,124 A | | 12/2000 | Austin | |
| 6,212,981 B1 | | 4/2001 | Brinker et al. | |
| 6,247,219 B1 | * | 6/2001 | Austin et al. | 29/434 |
| 6,364,426 B1 | | 4/2002 | Horne et al. | |
| 6,415,508 B1 | * | 7/2002 | Laps | 29/894.362 |
| 6,450,584 B2 | * | 9/2002 | Brinker et al. | 301/105.1 |
| 6,485,109 B2 | * | 11/2002 | Brinker et al. | 301/105.1 |
| 6,523,909 B1 | * | 2/2003 | Nakamura et al. | 301/105.1 |
| 6,619,163 B2 | * | 9/2003 | Tanio et al. | 82/112 |
| 6,634,266 B2 | * | 10/2003 | Brinker et al. | 82/168 |
| 6,702,398 B2 | * | 3/2004 | Laps | 301/105.1 |
| 6,708,589 B2 | * | 3/2004 | Brinker et al. | 82/1.11 |
| 2002/0066185 A1 | * | 6/2002 | Loustanau et al. | 29/898.06 |

FOREIGN PATENT DOCUMENTS

| | | | | |
|---|---|---|---|---|
| DE | 2635608 A1 | 9/1978 | | |
| DE | 2919411 A1 | 11/1980 | | |
| DE | 3900356 A1 | 7/1990 | | |
| DE | 19931140 A1 | 2/2000 | | |
| EP | 0371836 B1 | 10/1989 | | |
| EP | 0680836 B1 | 4/1995 | | |
| EP | 0703130 A2 | 9/1995 | | |
| EP | 0989321 A3 | 8/1999 | | |
| EP | 1 103 327 A1 | 11/1999 | | |
| FR | 2723886 A1 | 8/1994 | | |
| GB | 2107012 A | 4/1983 | | |
| GB | 2109734 A | * | 6/1983 | B23B/5/00 |
| WO | WO 9838436 A1 | * | 9/1998 | F16D/65/12 |

* cited by examiner

METHOD OF MAKING A WHEEL END ASSEMBLY WITH A MACHINED ROTOR HAVING REDUCED ON-VEHICLE RUNOUT

BACKGROUND OF THE INVENTION

The present invention is related to wheel ends and a method of making a wheel end to be installed on a vehicle for reduced runout of the vehicle.

Wheel ends and brake modules for motor vehicles are known and have been widely used in the automotive industry for many years. A typical wheel end of a vehicle generally includes a hub to which a half shaft or stub shaft attaches for rotation about an axis. A bearing assembly is disposed on the hub and mounts within a body of a steering knuckle to allow the half shaft, for example, to rotate and drive the hub about the axis. A rotor may be attached to the hub for rotational movement about the axis.

BRIEF SUMMARY OF THE INVENTION

Thus, it is one aspect of the present invention to provide an improved method of making a wheel end to be installed on a vehicle for reduced lateral runout.

It is another aspect of the present invention to provide a method of making a wheel end wherein machining a final cut on a rotor of the wheel end is performed after assembling and preloading the module for installation on a vehicle.

Another aspect of the present invention includes a method of making a wheel end wherein a preload is maintained while machining a final cut on a rotor of the wheel end and up to installation thereof on a vehicle.

It is yet another aspect of the present invention to provide a wheel end or brake module having a hub and a rotor attached thereto. The hub includes a flange and a hub shaft having inboard and outboard ends. The flange extends from the hub shaft at the outboard end. The rotor is mounted to the flange for radial movement with the hub. The rotor is machined after assembling and preloading the wheel end.

In one embodiment, a method of the present invention includes assembling the rotor and components with bearing surfaces to define an assembled module which is configured to be installed on the vehicle. The method further includes preloading the bearing surfaces, after the rotor and components are assembled, to define a preloaded condition of the assembled module. When assembled and preloaded, the assembled wheel end remains assembled and preloaded for installment on a vehicle. The method further includes mounting the assembled wheel end on a holding fixture and rotating the assembled wheel end about an axis on the holding fixture.

Furthermore, the method includes machining a final cut on the rotor to a rotor width while rotating, after assembling and preloading the assembled module to define the wheel end to be installed on the vehicle. Then, the wheel end remains assembled and preloaded for installment on a vehicle. It has been determined that machining the final cut on the rotor after assembling and preloading the module provides a substantially reduced on-vehicle or lateral runout on the vehicle so long as the wheel end remains assembled and preloaded for installation. This provides a reduced lateral runout on the vehicle.

It has been determined that the wheel end provides substantial reduction to lateral runout, since after machining the wheel end remains assembled and preloaded up to installation of the wheel end on the vehicle. This prevents and avoids additional interfaces and, in turn, additional runout to the wheel end after machining the final cut on the rotor.

Further objects, features and advantages of the invention will become apparent from consideration of the following description and the appended claims when taken in connection with the accompanying drawings.

BRIEF DESCRIPTION OF THE DRAWINGS

FIG. 5 is an end view of the wheel end depicting a rotor in accordance with one embodiment of the present invention.

DETAILED DESCRIPTION OF THE INVENTION

Figure 1:
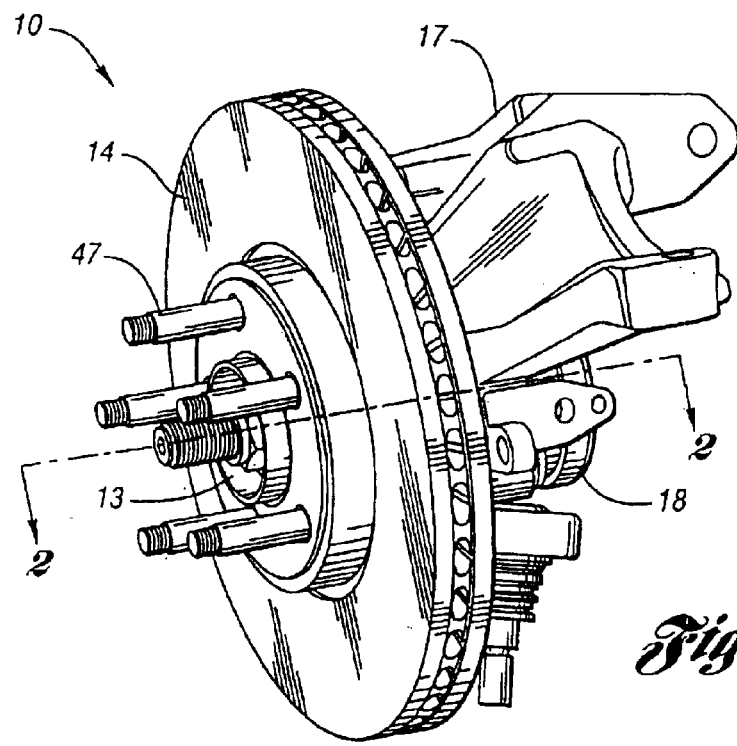
FIG. 1 is a perspective view of a wheel end having reduced lateral runout in accordance with one embodiment of the present invention.
Figure 2:
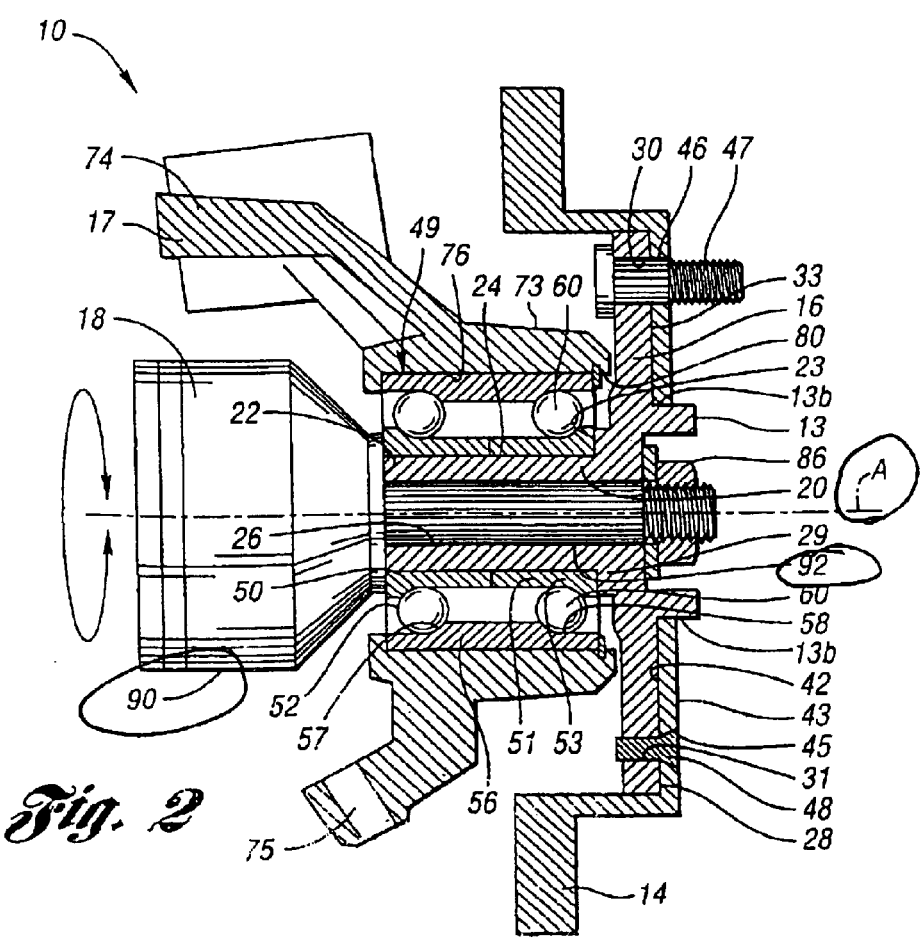
FIG. 2 is a cross-sectional view of the wheel end taken along lines 22 in FIG. 1.

FIGS. 1 and 2 illustrate a wheel end 10 for a vehicle having reduced lateral runout in accordance with the present invention. As shown, the wheel end 10 generally includes a hub 13 and a hub pilot 13b to which a rotor 14 is mounted or affixed via bolts 47. As best seen in FIG. 2, a bearing assembly 49 is disposed about the hub 13 and is received within a steering knuckle 17 which is mounted to the vehicle. As shown, a wheel end shaft or a mating shaft or a constant velocity joint housing and shaft housing and shaft 18 are disposed through the hub 13 and rotor 14 to allow the wheel end 10 to be driven.

FIG. 2 depicts a cross-sectional view of the wheel end 10 of FIG. 1. As shown, wheel end 10 comprises hub 13 including a flange 16 and a hub shaft 20 having inboard and outboard ends 22 and 23. The flange 16 extends from the hub shaft 20 at the outboard end 23. The hub shaft 20 includes a stepped boss 24 formed radially thereon for receiving races as described below. The hub shaft 20 defines a splined receiving bore 26 formed therethrough. The receiving bore 26 is configured to receive a mating shaft or constant velocity joint housing and shaft housing and shaft 18 to define an axis A about which the hub 13 may rotate.

Figure 3:
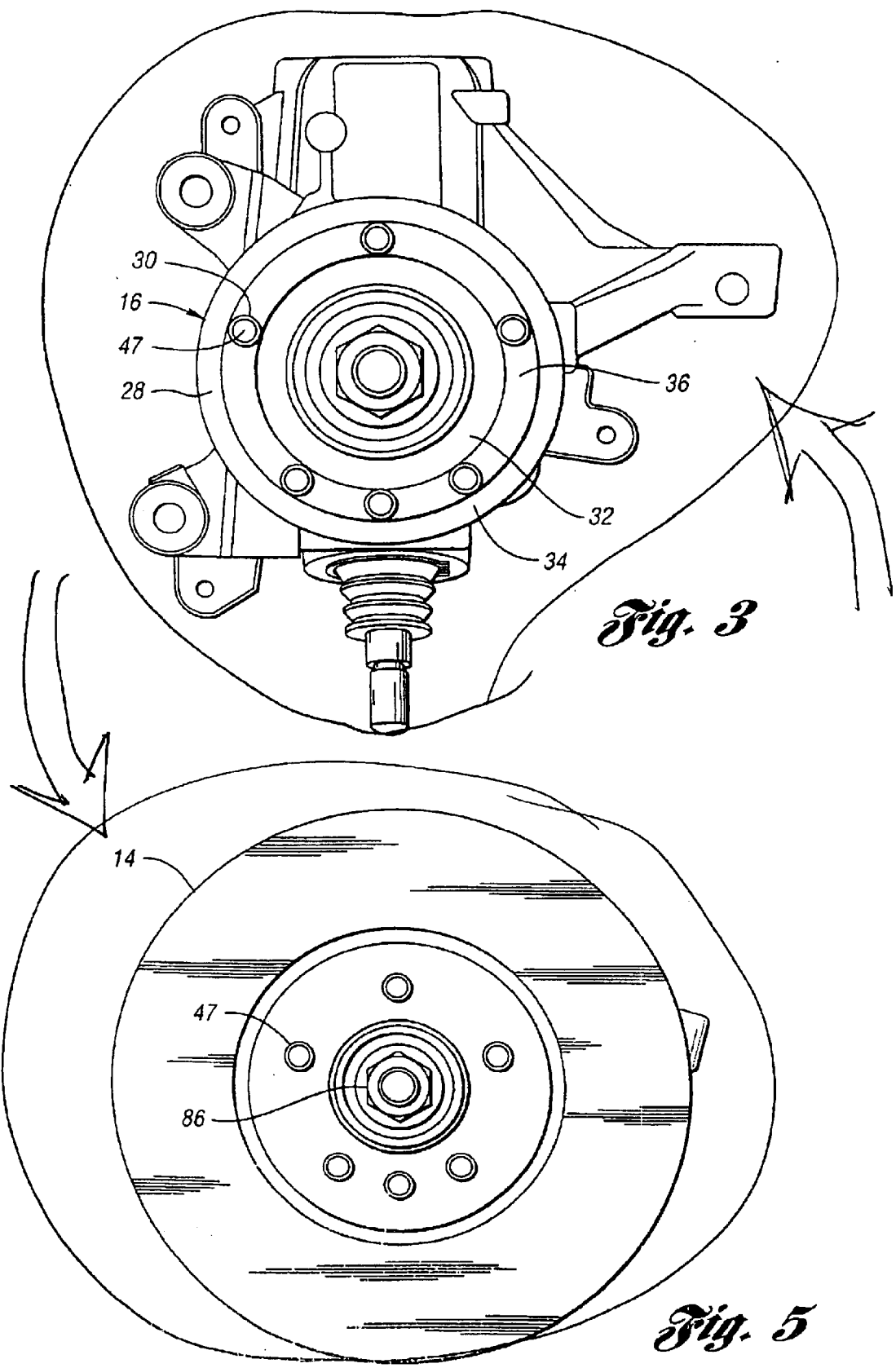
FIG. 3 is an end view of the wheel end depicting a flange of a hub to which a rotor may be mounted.
Figure 4:
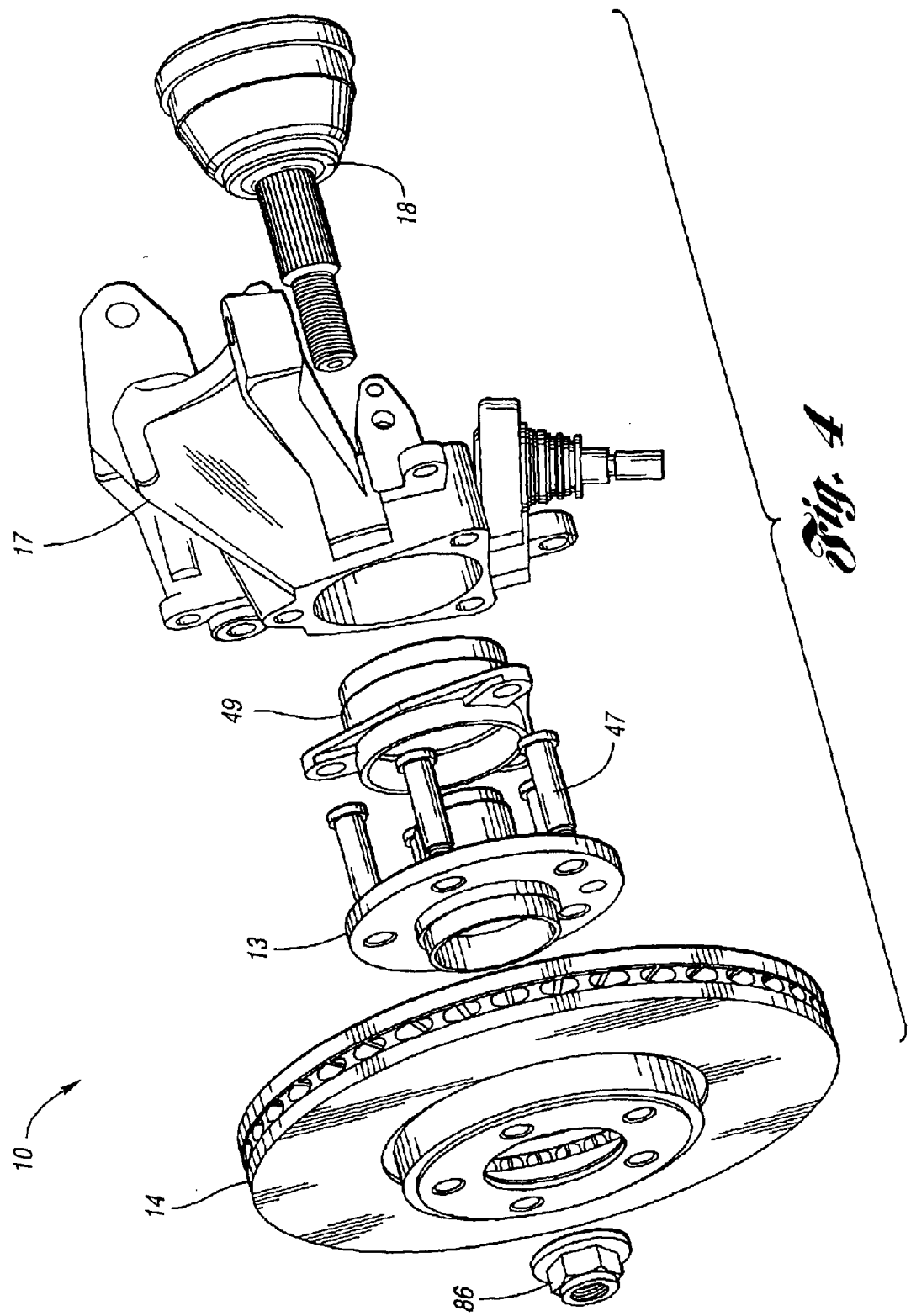
FIG. 4 is an exploded view of the wheel end of FIG. 1 in accordance with one embodiment of the present invention.

As shown in FIGS. 2–4, the flange 16 includes a face 28 having a plurality of mounting bores 30 formed therethrough for mounting the rotor 14 on the face 28 of flange 16. The face 28 additionally has at least one setting bore 31 formed therethrough and having internal threads. As illustrated in FIG. 3, the face 28 of flange 16 includes inner portion 32 and outer portion 34 which may be machined to a flange width or thickness as mentioned below. Face 28 further includes an annular groove 36 formed radially thereon and in alignment with mounting bores 30. The thickness between the inner and outer portions 32, 34 of the flange is greater than the thickness of the flange at the annular groove 36.

The annular groove 36 allows compensation of potential volcanoing when a bolt 47 is inserted through mounting bore 30. Volcanoing as known, is understood to be excess material and flash within walls defining the mounting bores displaced therethrough during assembly of the wheel end. The annular groove 36 provides a space or void in which the excess material may be received, preventing additional runout and other undesirable results. As shown in FIG. 3, the annular groove 36 is radially formed about the face 28 of flange 16 and is in alignment with each of the mounting bores 30.

FIGS. 2 and 5 depict a rotor 14 including inboard hub mounting surface 42 and outboard wheel mounting surface 43 and having a setting aperture 45 and a plurality of apertures 46 formed therethrough. When apertures 45 and 46 and bores 30 and 31 are in alignment, bolts 47 may be disposed through bore 30 and aperture 46 and set screw 48 may be disposed through bore 31 and aperture 45 to mount rotor 14 onto flange 16.

Wheel end 10 further includes bearing assembly 49 radially disposed about hub shaft 20 on its outer surface 24. Bearing assembly 49 is abutted by a stepped boss 29 at the outboard end 23 and by the constant velocity joint housing and shaft 18 at the inboard end 22. Bearing assembly 49 includes inboard inner bearing race 50 and outboard inner bearing race 51 having inboard inner raceway 52 and outboard inner raceway 53, respectively, formed thereon. Bearing assembly 49 further includes outer bearing race 56 having inboard outer raceway 57 and outboard outer raceway 58. The bearing assembly 49 is configured such that inboard and outboard inner bearing races 50, 51 cooperate with outer bearing race 56. Thus, inboard and outboard inner bearing races 50, 51 cooperate with outer bearing race 56 such that inboard inner raceway 52 is in alignment with inboard outer raceway 57 to house bearings 60 therein. Moreover, outboard inner raceway 53 is in alignment with outboard outer raceway 58 to house bearing 60 therein. As shown, inboard and outboard inner bearing races 50, 51 are radially disposed about hub shaft 20 on stepped boss 24.

FIGS. 2 and 4 further illustrate a steering knuckle 17 having a body 73 and first and second knuckle arms 74, 75 extending from the body 73. The first and second knuckle arms 74, 75 are mounted to a strut or an upper control arm and a low control arm, respectively, of the motor vehicle (not shown). As shown, steering knuckle 17 receives bearing assembly 49 mounted therein. The body 73 includes an inner wall 76 formed therethrough to define a center bore 80 of the body.

As shown, the bearing assembly 49 is disposed in center bore 80 and engages with inner wall 76 to be mounted therein. Constant velocity joint housing and shaft housing and shaft 18 is disposed through the receiving bore 26 of hub shaft 20 and through the center bore 80 of steering knuckle 17. In this embodiment, constant velocity joint housing and shaft housing and shaft 18 is a half shaft having a bell 90 and a stem 92 extending therefrom. Stem 92 has an outer surface having an external spline to be received in the receiving bore 26. The splined receiving bore 26 of hub shaft 20 is configured to cooperate with the external spline of stem 92. This allows torque to be transferred, as known, to provide rotation of rotor 14 about axis A. The stem's external spline is in mating relationship with internal spline of the hub's receiving bore 26, as known in the art.

The constant velocity joint housing and shaft housing and shaft 18 is secured therein by locking nut 86 which locks onto a threaded portion at the end of the constant velocity joint housing and shaft housing and shaft. This allows the rotor and hub to be driven or rotated about axis A by the constant velocity joint housing and shaft 18. In operation, the constant velocity joint housing and shaft 18 is powered by the vehicle to rotate or drive the rotor to which a wheel (not shown) may be mounted. Although the constant velocity joint housing and shaft 18 is shown as a half shaft for a driven wheel end, a stub shaft for non-driven wheel may be used without falling beyond the scope or spirit of the present invention.

It is understood that the wheel end depicted in FIGS. 1–5 and discussed above is merely one example of a wheel end which may be machined in accordance with the present invention. Other designs and configurations of a wheel end may be used and do not fall beyond the scope or spirit of the present invention. For example, the hub shaft may be configured to have one or a plurality of raceways integrally formed thereon thereby eliminating the need for one or a plurality of inner bearing races or bearing surfaces.

Figure 6:
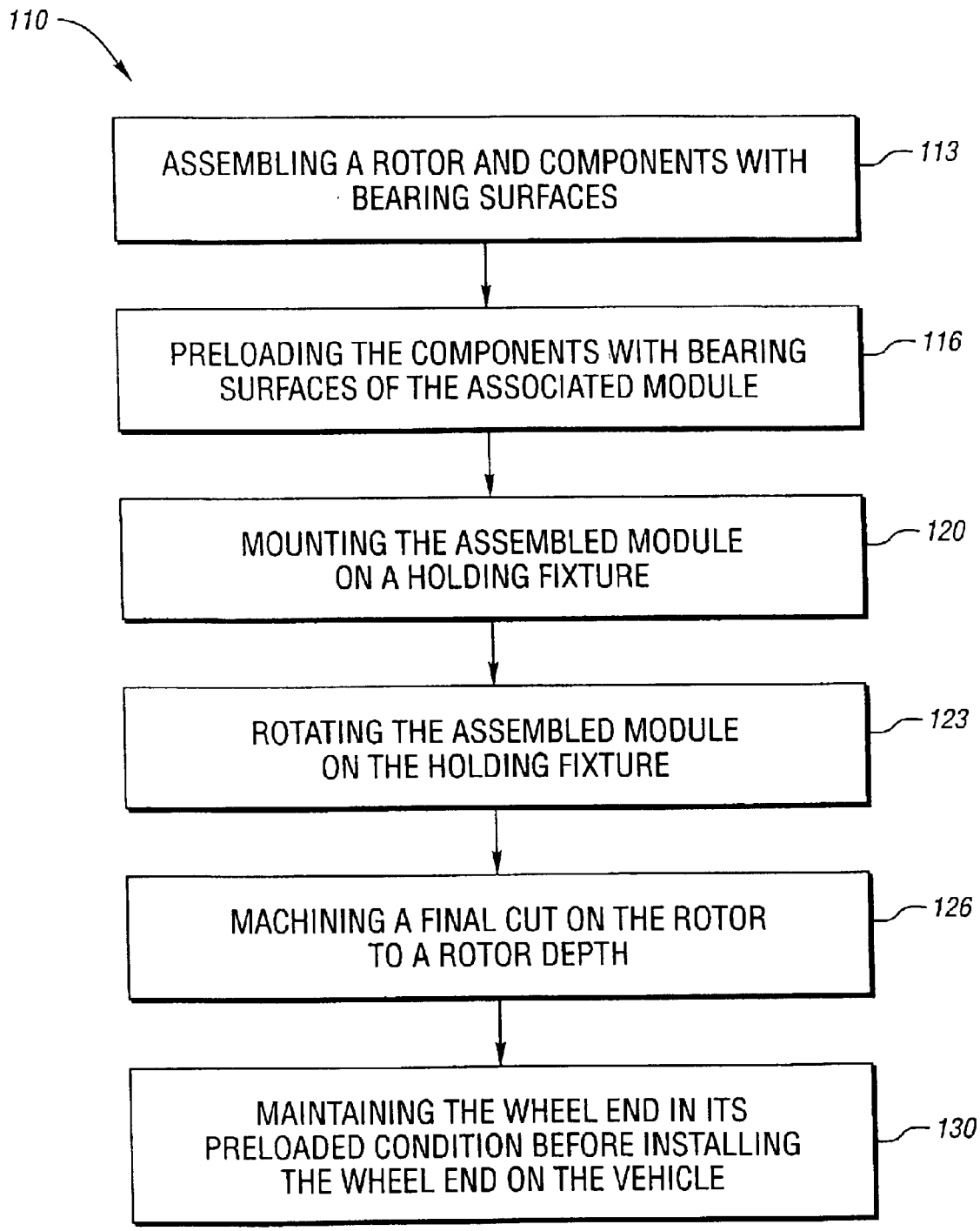
FIG. 6 is a flow chart depicting one method of making the wheel end for reduced runout on a vehicle for reduced runout in accordance with the present invention.

FIG. 6 illustrates a flow chart of one method 110 of making a wheel end or brake module mentioned above to be installed on a vehicle for reduced lateral runout. Method 110 includes assembling a rotor and components with bearing surfaces to define an assembled wheel end or brake module configured to be mounted to the vehicle in box 113. The components with bearing surfaces may include the knuckle, hub, bearing assembly, and constant velocity joint housing and shaft discussed above. As mentioned above, the rotor and corresponding components with bearing surfaces are assembled to define the wheel end as shown in FIG. 1.

In box 116, the method 110 further includes preloading the assembled wheel end. This may be accomplished by tightening the constant velocity joint housing and shaft 18 with the nut 86, and applying force onto the bearing assembly to create a preload on the bearing assembly. In this embodiment, the step of preloading includes applying a set amount of radial load and thrust load on the components with bearing surfaces for mounting the assembled module to the vehicle.

It is to be understood that the step of preloading the assembled wheel end includes applying a thrust load and/or a radial load to the bearing assembly as typically known. This may be accomplished by applying an axial load on the wheel end shaft with the locking nut. However, other means of preloading may be used and do not fall beyond the scope or spirit of the present invention. In this embodiment, the step of preloading includes applying a set amount of radial load and thrust load, e.g. about 40,000 to 180,000 Newtons, on the components with bearing surfaces for mounting the assembled module to the vehicle.

Then, in box 120, the method further includes mounting the assembled wheel end on a holding fixture. In this embodiment, the holding fixture may be a multi-jaw chuck, e.g., a three-jaw chuck. However, the holding fixture may be any other fixture to which the assembled wheel is to be mounted, e.g., other multi-jaw chucks, a vehicle, or a suspension sub-frame module of a vehicle. In this embodiment, the constant velocity joint housing and shaft (mentioned above) may be a half shaft for a driven wheel end. However, a stub shaft for a non-driven wheel end may be implemented without falling beyond the scope or spirit of the present invention. The steering knuckle is mounted onto the holding fixture so that the components with bearing surfaces and the rotor are rotatable about axis A.

Method 110 further includes rotating the assembled module about axis A on the holding fixture in box 123. This allows the rotor to be driven or rotated about axis A in preparation for machining a final rotor cut. The method may further include measuring the actual runout of the assembled module when rotating about axis A.

Preferably, but not necessarily, the method 110 may include machining a final hub cut on the face of the flange. The machining apparatus may be configured to cut the inner and/or outer portions of the flange at a predetermined flange width. In this embodiment, the apparatus only cuts the inner and outer portions without contacting the surface of the annular groove. It is to be noted that the flange width may be any desired width so long as the flange width is not less than the width of the walls defining the annular groove. It has been determined that the final hub cut provides a reduced runout on the vehicle so long as the preload is maintained up to installation of the wheel end on the vehicle.

Method 110 further includes machining a final rotor cut on the rotor to a rotor width in box 126, while rotating, after assembling and preloading the assembled module. To accomplish this, any suitable machining apparatus or device may be used to machine the final rotor cut on the rotor to the rotor width. In this embodiment, machining the rotor is based on the measured or actual runout of the assembled module to reduce the measured runout therefrom. It has been determined that machining the rotor reduces runout to about 10 to 50 micron. In this embodiment, the rotor width may be about 10–100 millimeters. The final rotor cut represents a last cut performed on the rotor prior to installation of the wheel end to the vehicle. In this embodiment, the rotor width may be reduced by 200–1,200 microns.

It has been determined that machining the final rotor cut on the rotor after assembling the module and preloading the module provides a wheel end having a substantially reduced runout on the vehicle. It has been further determined that the result is a substantial reduced runout relative to other wheel ends. After machining the final cut on the rotor, the wheel end is maintained in its assembled and preloaded condition in box 130. Thus, the wheel end is to be installed on the vehicle without any disassembling or further unloading or preloading. As a result, a runout of about 10–50 micron after machining the final cut on the rotor remains constant when the wheel end is installed on the vehicle. This avoids added runout to the wheel end and additional machining caused by further disassembling and unloading after the final cut.

As a person skilled in the art will recognize from the previous detailed description and from the figures and claims, modifications and changes can be made to the preferred embodiments of the invention without departing from the scope of this invention defined in the following claims.

What is claimed is:

1. A method of making a wheel end to be installed on a vehicle featuring reduced lateral runout, wherein the wheel end as installed on the vehicle requires a set amount of radial and thrust bearing preload, the method comprising:

assembling a hub and components with bearing surfaces to define an assembled module configured to be mounted to the vehicle, wherein the hub includes a hub flange defining an outboard face for axially supporting a rotor, and the components with bearing surfaces cooperate to define bearings supporting the hub for relative rotation within the assembled module;

preloading the bearings of the assembled module to the set amount to thereby define a preloaded condition of the assembled module;

mounting the assembled module on a holding fixture rotatable about a reference axis;

while rotating the assembled module on the holding fixture about the reference axis, machining the face of the hub flange;

securing a rotor to the hub flange face while maintaining the assembled module on the holding fixture;

while rotating the assembled module and secured rotor about the reference axis, machining a cut on the rotor to a rotor width to define the wheel end; and removing the wheel end from the holding fixture while maintaining the assembled module in the preloaded condition.

2. The method of claim 1 wherein rotating the assembled module includes driving the assembled module on the holding fixture about an axis for machining the rotor.

3. A method of making a wheel end to be installed on a vehicle for reduced lateral runout, wherein the wheel end as installed on the vehicle requires a set amount of radial and thrust bearing preload, the method comprising:

assembling a rotor, a hub including a hub flange to which the rotor is axially secured, and components with bearing surfaces to define an assembled module configured to be mounted to the vehicle;

preloading the components with bearing surfaces of the assembled module to be mounted to the vehicle by applying the set amount of radial load and thrust load on the bearing surfaces to define a preloaded condition of the assembled module;

mounting the assembled module within a knuckle;

fixturing the knuckle so as to permit relative rotation of the hub;

machining the hub flange while rotating the the hub about a reference axis;

securing the rotor to the machined hub flange while maintaining the knuckle fixtured; and, machining a final cut on the rotor while rotating the the hub about the reference axis; to define the wheel end; and maintaining the assembled module in the preloaded condition before installing the wheel end on the vehicle.

4. The method of claim 3 further comprising measuring runout of the vehicle based on the assembled module before machining the rotor.

5. The method of claim 4 wherein machining the rotor is based on the measured runout of the assembled module to reduce the measured runout.

6. The method of claim 3 wherein rotating the assembled module includes driving the assembled module on a holding fixture about the reference axis.

7. A method of making a wheel end to be installed on a vehicle for reduced lateral runout, wherein the wheel end as installed on a vehicle requires a set amount of radial and thrust bearing preload, the method comprising:

assembling a hub and components with bearing surfaces to define an assembled module configured to be mounted to the vehicle, wherein the hub includes a hub flange defining an outboard face, and the components with bearing surfaces cooperate to define bearings supporting the hub for relative rotation within the assembled module;

preloading the bearings of the assembled module by applying the set amount of bearing preload to thereby define a preloaded condition of the assembled module;

mounting the assembled module on a holding fixture;

machining the outboard face of the hub while rotating the hub of the mounted assembled module about a reference axis;

affixing the rotor to the face of the hub without removing the assembled module from the holding fixture; and machining a final rotor cut on the rotor while rotating the hub of the mounted assembled module about the reference axis.

8. The method of claim 7 including dismounting the assembled module from the holding fixture while maintaining the assembled module in the preloaded condition before installing the wheel end on the vehicle.

9. The method of claim 8 further comprising measuring runout of the assembled module in the preloaded condition before machining the rotor.

10. The method of claim 9 wherein machining the rotor is based on the measured runout of the assembled module to reduce the measured runout therefrom.

11. The method of claim 8 wherein the final cut on the rotor represents a last cut performed on the rotor prior to installation of the wheel end on the vehicle.

* * * * *